(12) United States Patent
Kaufman et al.

(10) Patent No.: US 9,148,016 B2
(45) Date of Patent: Sep. 29, 2015

(54) DC MICROGRID FOR INTERCONNECTING DISTRIBUTED ELECTRICITY GENERATION, LOADS, AND STORAGE

(75) Inventors: Joshua Daniel Kaufman, Gorham, ME (US); Benjamin Francis Polito, Gorham, ME (US); Keith Thomas Richtman, Boston, MA (US)

(73) Assignee: Pika Energy Inc., Westbrook, ME (US)

( * ) Notice: Subject to any disclaimer, the term of this patent is extended or adjusted under 35 U.S.C. 154(b) by 695 days.

(21) Appl. No.: 13/481,404

(22) Filed: May 25, 2012

(65) Prior Publication Data

US 2012/0299386 A1    Nov. 29, 2012

Related U.S. Application Data

(60) Provisional application No. 61/490,563, filed on May 26, 2011.

(51) Int. Cl.
*H02J 1/00* (2006.01)
*H02J 1/12* (2006.01)

(52) U.S. Cl.
CPC ............... *H02J 1/12* (2013.01); *Y10T 307/707* (2015.04)

(58) Field of Classification Search
CPC ........................................................ H02J 1/12
USPC ............................................................. 307/82
See application file for complete search history.

(56) References Cited

U.S. PATENT DOCUMENTS

| 4,475,209 | A * | 10/1984 | Udren ........................... 375/214 |
| 7,116,010 | B2 | 10/2006 | Lasseter et al. |
| 2010/0198421 | A1* | 8/2010 | Fahimi et al. ................. 700/291 |
| 2012/0161527 | A1* | 6/2012 | Casey et al. ..................... 307/80 |
| 2014/0091622 | A1* | 4/2014 | Lucas et al. ..................... 307/19 |

OTHER PUBLICATIONS

Lasseter, Robert, "CERTS Microgrid", International Conference on System of Systems Engineering, (2007), 6 pgs.

* cited by examiner

*Primary Examiner* — Jared Fureman
*Assistant Examiner* — Duc M Pham
(74) *Attorney, Agent, or Firm* — Schwegman Lundberg & Woessner, P.A.

(57) ABSTRACT

A device includes an energy unit coupled to an energy device and adapted to couple a pair of split DC rails. A controller senses the voltage on the DC rails and regulates its output current response by means of an autonomous current response that creates the aggregate effect of controlling the rail voltage in cooperation with other units coupled to the DC rails. A system includes multiple such devices coupled to split DC rails.

20 Claims, 7 Drawing Sheets

DC MICROGRID FOR INTERCONNECTING DISTRIBUTED ELECTRICITY GENERATION, LOADS, AND STORAGE

RELATED APPLICATION

This application claims priority to U.S. Provisional Application Ser. No. 61/490,563 (entitled Universal interconnection bus for power and data transfer from distributed energy devices, filed May 26, 2011) which is incorporated herein by reference.

BACKGROUND

As the world shifts to cleaner sources of energy, electricity generation is becoming increasingly distributed, in response to the geographically dispersed nature of the available clean resources. Also, large-scale electric storage capability will be needed, due to the varying availability of natural energy sources.

The function of an electrical power grid is to transmit electrical power from its sources to its loads. Its origins date to the 1880s when Thomas Edison established the first direct current (DC) distribution grid, which was soon replaced by Tesla's alternating current (AC) grid. AC transmission won out because of the ease of increasing AC voltage with low-frequency transformers for long-distance transmission, and subsequently transforming back to lower voltage at the point of use. The existing AC infrastructure ("the grid") works well for large centralized power plants with distributed loads, but is not well-suited to support distributed power production or electrical energy storage. Among other limitations, the existing AC grid has no built-in provisions for communication, for instance to communicate the real-time availability of energy relative to demand.

Advances in power electronics are enabling efficient and inexpensive DC power conversion, while rising materials prices (notably copper) add to the cost of conventional AC power conversion. This is especially true in the case of distributed sources such as solar, wind, and fuel cells, since these sources are either fundamentally DC in nature or must be converted to DC before they can be converted to grid-compatible AC. Most means of electrical storage are also fundamentally DC in nature, as are nearly all modern loads (with the exception of induction motors). The present requirement of converting the inputs/outputs of these devices to AC for interconnection reduces their efficiency and increases their costs.

SUMMARY

A DC electricity distribution network or microgrid is disclosed, providing a means to interconnect disparate electrical loads, storage and generation. In one embodiment, the network comprises a split-voltage parallel DC bus and a plurality of converter units attached to the bus, where the converter units have a real-time voltage-level signaling means for maintaining bus stability, and a powerline-carrier communication means for transmitting and receiving status and performance data.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software stored on a storage device, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

For purposes of this description an energy unit is any electronic device that includes a power converter that connects via suitable contacts to a direct current (DC) source/sink to another electric source or sink including DC/DC, DC/AC, AC/DC voltage converters or current converters. An energy device is an AC or DC source or sink of electric power. Examples include solar panels, wind turbines, batteries, utility grids, lighting and other loads. A bus is a pair of DC conductor rails.

Figure 1A:
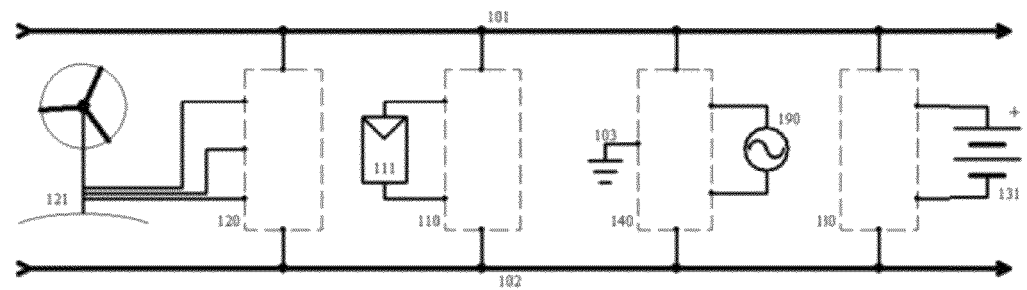
FIG. 1A is a block schematic diagram of a local energy distribution system according to an example embodiment.

Referring to FIG. 1A, in one embodiment a local energy distribution system is provided, comprising positive rail 101 and negative rail 102, which carry DC current at substantially equal and opposite electric potential of approximately 180-210V relative to ground 103, and serving to connect one or more source energy units 110, 120 to the AC grid 190, through an inverter energy unit 140, and optionally to storage energy unit 130, which connects the battery bank energy device 131 to the DC rails. Additional energy units may be connected in parallel, for instance to serve DC loads. The substantially equal and opposite electric potential enables a simplified inverter design by providing the minimum voltage required to make the positive and negative going output wave shapes while not being such a high voltage as to require more expensive switching components. The voltages on each rail need not be equal and opposite, but may vary by up to ten percent or so in some embodiments. In further embodiments, the potential of each rail or conductor relative to ground potential is in the range of +/−180-210 volts.

Figure 1B:
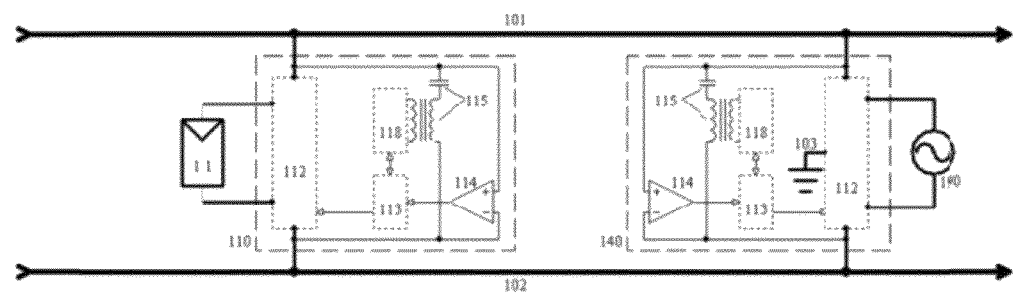
FIG. 1B is a block schematic diagram of an energy unit according to an example embodiment.
Figure 1C:
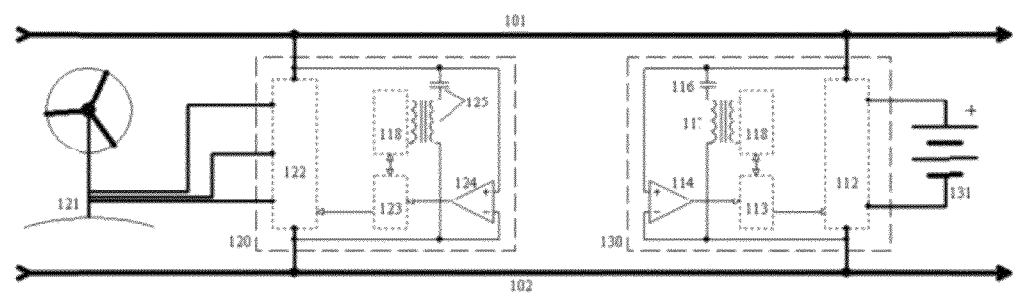
FIG. 1C is a block schematic diagram of a further energy unit according to an example embodiment.

Referring to FIG. 1B, energy unit 110 accepts electric power from an energy device, for instance PV panel 111, or a string of such PV panels connected in series, and contains a DC-DC power converter circuit 112 and a control circuit 113. The control circuit has means 114 for measuring the voltage of rails 101 and 102, and a coupling circuit 115 capable of coupling an AC signal between the control circuit and the DC rails, in order to transmit and receive data by powerline carrier communication (PLC). PLC communication allows devices connected to the bus (e.g. 110, 120) to communicate setpoints and operational parameters. Additionally it allows users to gather information and make changes to component setpoints from any device on the bus.

Other energy units are optionally connected to the rails 101 and 102 in parallel with converter 110, for instance energy unit 120, which accepts power from a wind turbine 121, typically as three-phase 'wild' AC, (variable voltage, variable frequency), and contains an AC-DC converter 122 capable of converting the wind turbine output to regulated DC voltage for connection to rails 101, 102. Converter 120 contains a control circuit 123, voltage sensing means 124, and a coupling circuit 125 for communication, as described above.

In some embodiments, power line carrier communication is implemented by superimposing an AC signal on the DC bus, for instance by means of 144 kHz frequency shift keying (FSK). With reference to the lower right of FIG. 1B, a coupling circuit comprises a coupling capacitor 116, transformer 117, and communication controller chip 118. A high frequency signal is generated by controller chip 118, and is modulated by a low-baud rate data signal and the result is amplified. This modulated high-frequency current may be injected onto the bus through isolating transformer 117 and coupling capacitor 116. For reception, the transmitted signal passes through a receiving-end isolating capacitor e.g. 116 and is filtered appropriately to retrieve the data stream. Integrated circuits for performing FSK for PLC communication are commercially available, for instance the PLM-1 IC from Ariane Controls. The AC communications signal may be injected onto the DC rails in differential mode between the rails or in common mode with respect to ground.

Because each rail of the bus carries only about half of the total system voltage relative to earth ground (e.g. +/−190V in a 380V system), the potential for electric shock is much reduced, while still achieving the high transmission voltage that enables efficient power transmission. Additionally, the split-rail approach enables a single-stage design for inverter 140, by eliminating the need for an input conversion stage. This significantly reduces the cost and power loss of the inverter. Finally, the split-rail architecture makes it possible to detect ground fault conditions.

One unique attribute of the energy distribution system of FIG. 1A is the absence of a central controller or a master bus regulator. Stability of the bus is instead achieved by the collective action of the converter modules connected to it. Each energy unit connected to the bus regulates its current onto the bus according to the bus voltage as measured (e.g. by voltage sensing network 114), with a strategy that collectively effects a voltage-regulated system. This voltage-controlled power regulation enables plug-and-play operation with arbitrary combinations of sources and loads.

Three general types of energy units may be defined for use with the energy distribution system proposed here. Primary Source Units (PSU) supply electric power to the bus, for instance from wind turbines or solar panels. Load Units (LU) draw power from the bus, and Energy Storage Units (ESU) are bi-directional, and may draw power from the bus, or supply power to it.

Figure 2A:
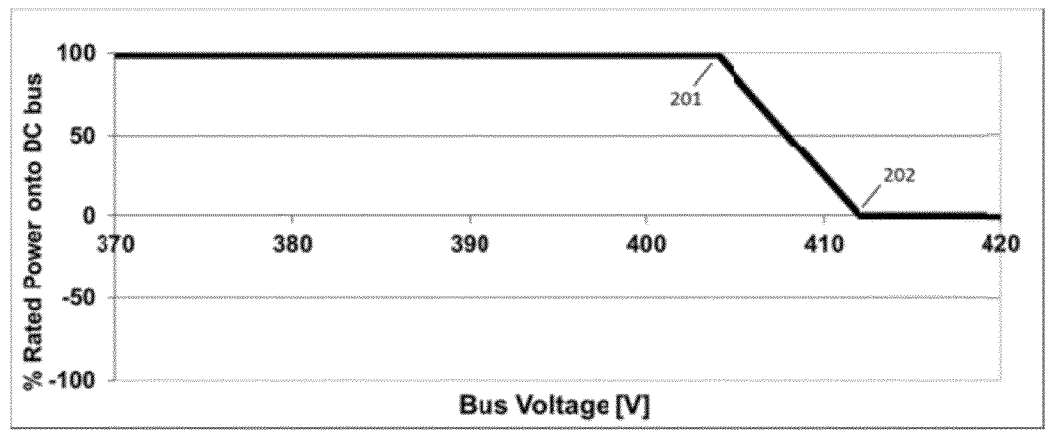
FIG. 2A is a graph illustrating operation of a source unit according to an example embodiment.

With reference to FIG. 2A, a Primary Source Unit is permitted to supply as much current as possible (up to its rated limit) when the bus voltage is below a source threshold 201, and then smoothly curtails its output as bus voltage increases beyond that threshold, such that no current is delivered to the bus when the bus voltage reaches a higher source cutoff voltage 202. In other embodiments, the PSUs regulate to a maximum voltage without the linear ramp to zero power. Exemplary types of PSU include without limitation converters for solar photovoltaic modules, wind turbines, fuel cells, hydroelectric installations, fossil-powered heat engines, or rectifiers (where the grid acts as a virtual energy source).

Figure 2B:
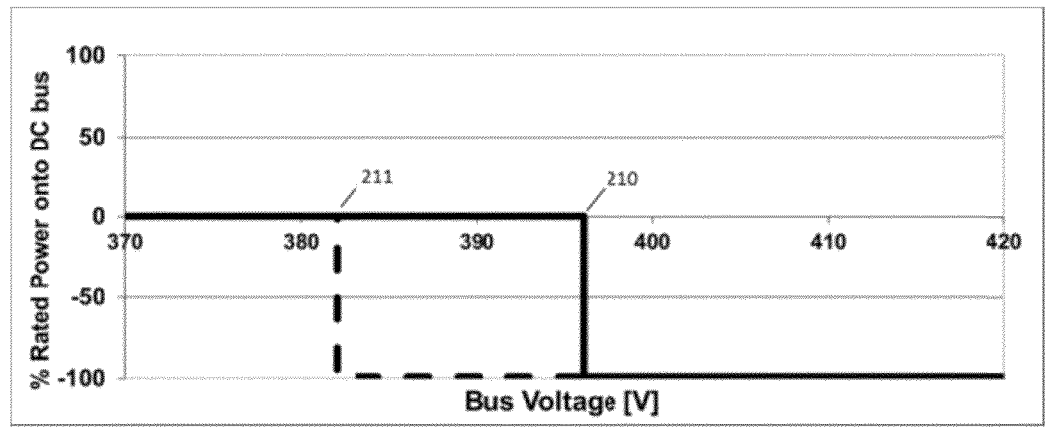
FIG. 2B is a graph illustrating operation of a load unit according to an example embodiment.

With reference to FIG. 2B, a Load Unit is permitted to draw current from the bus up to its rated limit when the bus voltage is above a load threshold voltage 210, but must curtail its current consumption below the hysteretic cutoff voltage 211. The load current consumption may be increased gradually above the threshold voltage, or it may be on/off. Load units may be programmed for relative priority, as may be beneficial where more than one Load Unit is connected to a single network. A lower priority LU is programmed with a high load threshold voltage, such that it curtails its load before a LU with a lower load threshold voltage. Exemplary types of energy devices that a LU might connect include without limitation lighting, HVAC loads, appliances, servers and other data processing equipment, and grid-tied inverters (where the grid acts as a virtual load).

Figure 2C:
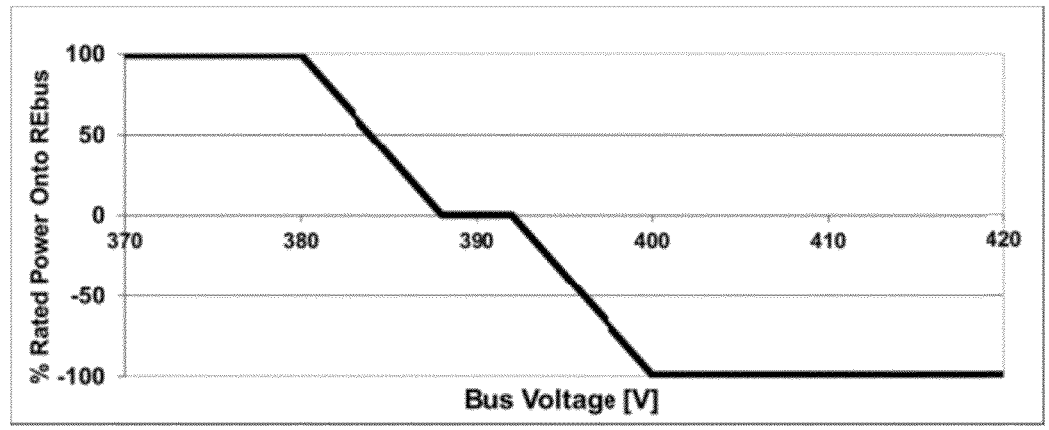
FIG. 2C is a graph illustrating operation of an energy storage unit according to an example embodiment.

With reference to FIG. 2C, an Energy Storage Unit sinks current from the bus at high bus voltage, but (optionally) sources current to the bus at low bus voltage. When acting like a load, the ESU transfers energy to its storage medium, and when acting like a source it supports the loads on the network. In this way, excess energy may be stored for later use. Exemplary types of energy device that an ESU might connect include without limitation battery banks, electric vehicles, flow batteries, and electrolyzer/fuel cell systems, as well as bi-directional grid-tied inverters (where the grid acts as virtual storage—i.e. as both a source and a load). Importantly ESUs must follow the prescribed load curve and should not exhibit the on/off behavior of some forms of load unit.

In some embodiments, the voltage-controlled power regulation enables multiple identical energy devices to be connected to the bus in parallel. For example, if two Energy Storage Units are attached to the bus in parallel with the same load threshold settings, they will share the available power equally. This increases scalability of renewable energy systems, reduces the economic barrier to initial system installation and avoids obsolescence as the system is scaled up. Parallelability also reduces the number of models that a manufacturer must produce. For example, instead of offering 1 kW, 2 kW and 4 kW converter models, the converter manufacturer may elect to produce only a 1 kW model. Consumers can purchase 1, 2 or 4 of them. The 1 kW models could possibly be produced at significantly lower cost because of the higher volume.

Figure 3:
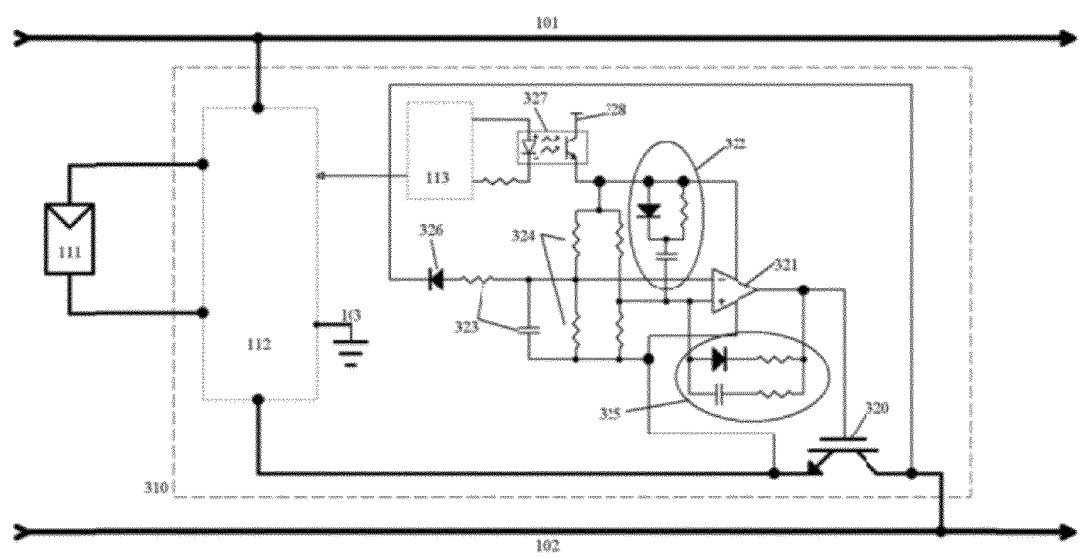
FIG. 3 is a block schematic diagram illustrating the disconnect circuit details of a source converter according to an example embodiment.

One of the major drawbacks to previous DC distribution systems has been the requirement for expensive disconnect switches capable of breaking a sustained electrical arc. In some embodiments of the present invention, means are provided to enable converters connected to the bus to survive a sudden drop in impedance, for example an accidental or intentional short circuit. With reference to FIG. 3, a source converter 310 is equipped with a series switch 320, for instance a solid state switch such as a Field Effect Transistor (FET), and a differential sensing amplifier 321 coupled to a circuit that controls the gate of the FET 320. In normal operation a blocking diode 326 is forward biased and keeps the amplifier input voltage sufficiently low such that the switch remains on to connect the device to the bus. However, in the event of a sudden drop in bus impedance, the rising current across the on resistance of FET 320 creates a voltage across the switch which is blocked by blocking diode 326, preventing overvoltage to the amplifier circuit. The increased voltage across the switch 320 reverse biases the blocking diode 326 which was previously loading the balance circuit 324 which in general is pulling the negative terminal of the amplifier 321 high enough to cause a disconnect. With the blocking diode no longer pulling down the balance circuit, the amplifier switches state and turns off the switch 320. The filter circuit 323 prevents spurious activation of the disconnect circuit. The compensation circuit 325 ensures that the switch does not glitch and retains it's off state indefinitely. In this embodiment the entire circuit is referenced to the negative bus rail to facilitate driving the switch. In order to operate the disconnect circuit from the logic circuit 113 an optoisolator switch 327 is employed which connects a power supply 328 that is referenced to the lower side of the switch 320. Reset circuit 322 causes the amplifier to latch on when initially powered up, but critically does not prevent the disconnect circuit from turning the switch off. For the logic circuit 113 to turn the switch back on after it has been activated (disconnected), it must first turn the power to the circuit off by deactivating the optoisolator 327 and then repowering it.

This system of disconnect operation is advantageous for two reasons. First, the microprocessor never directly turns the switch on which if commanded directly for even a short time (for example, the time between two instruction cycles on the microprocessor) could damage the power converter. In this circuit protection of the power converter is never disabled. Second, the expensive optoisolated gate driver typically employed is replaced with one inexpensive optoisolator and only one output pin on the microprocessor is required.

Converter 310 may be designed to limit its current output in the event of a short circuit on the bus, disconnect from the bus, and shut down completely within a short time after a short has occurred. This protects the converter 310 from damage from excessive current, without need for a physical disconnect capable of breaking a DC arc, and enables the bus to be shut down intentionally with a short circuit if desired. Previously, shutdown of a HVDC bus required that every attached device be open-circuited from the bus with switchgear capable of breaking a DC arc. This topology is significantly less expensive, and it provides a method for any single device to effect a bus shutdown by shorting the bus conductors—a novel and beneficial ground fault protection system. This technique means that any ground fault or other potentially hazardous situation can be handled by any device attached to the bus.

Figure 4:
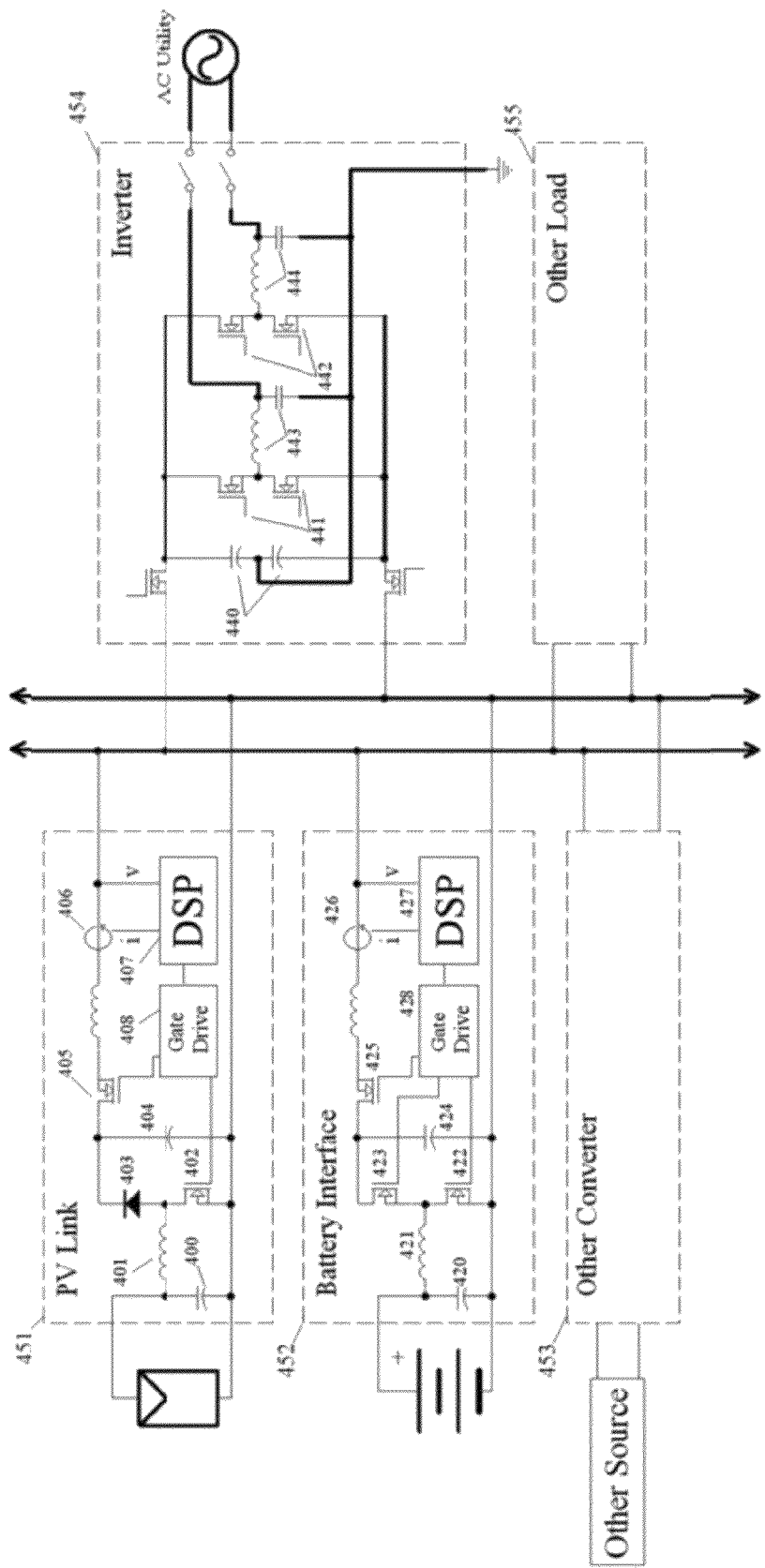
FIG. 4 is a block schematic diagram of a local energy distribution system to an example embodiment.

Several converter designs may be suitable for use with the bus architecture of the present invention. With reference to FIG. 4 a source converter 451 for an array of one or more solar PV modules comprises a single-phase boost converter, comprising a source capacitor 400, a boost inductor 401, a boost switch 402, a boost diode 403, a bus side capacitor 404, a disconnect switch 405, a sensor network 406, a Digital Signal Processor (DSP) 407, and a gate drive circuit 408. In operation, the DSP 407 drives the boost switch 402 with a pulse-width modulation (PWM) signal via the gate drive circuit 408, storing energy in inductor 401 and driving current through boost diode 403 and onto the bus. The DSP 407 monitors bus voltage and current, and performs Maximum Power Point Tracking to ensure the greatest possible output from the PV array.

FIG. 4 illustrates an example design of an Energy Storage Unit 452 for interfacing with a battery bank, for instance at a lower operating voltage than the bus. The circuit comprises a storage side capacitor 420, an inductor 421, a boost switch 422, a buck switch 423, a bus side capacitor 424, a disconnect switch 425, a sensor network 426, a digital signal processor 427, and a gate drive circuit 428. When storing energy in the battery, the DSP 427 provides a pulse-width-modulated signal to the buck switch 423, storing energy in inductor 421 and driving current into the battery bank. When delivering stored energy to the bus, the DSP 427 provides a PWM signal to the boost switch 422, storing energy in inductor 421 and driving current through the buck switch 423 and onto the bus. Disconnect switch 425 may be used to isolate the ESU converter from the bus in case of a short circuit.

FIG. 4 illustrates an exemplary design of bidirectional grid-tie inverter ESU 454, comprising split input capacitance 440, half bridges 441 and 442, output filter networks 443 and 444, sensor network, DSP, and gate drive circuit. In operation, the DSP drives PWM signals to half bridges 441 and 442 through gate drive circuit 447, in order to produce a sinusoidal output current with the desired energy output corresponding to the voltage of the bus.

Figure 5A:
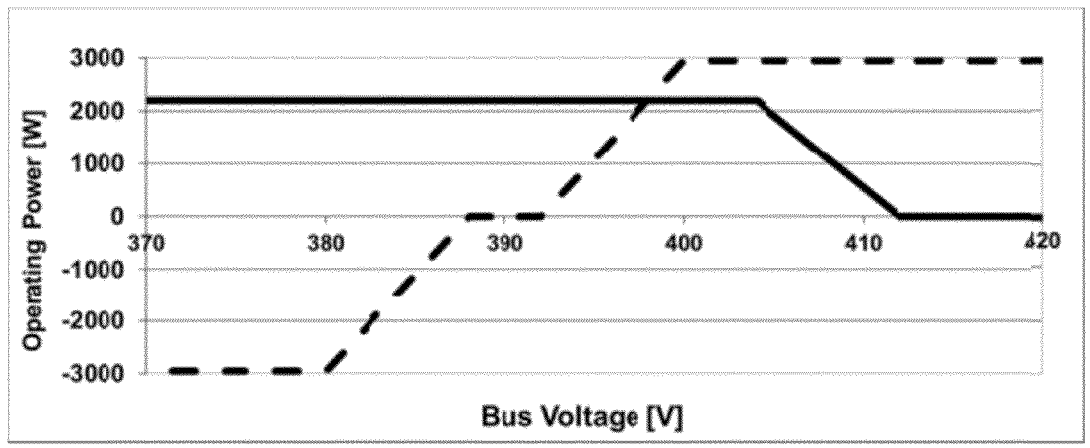
FIG. 5A is a graph illustrating a voltage controlled power regulation curve of an energy unit according to an example embodiment.
Figure 5B:
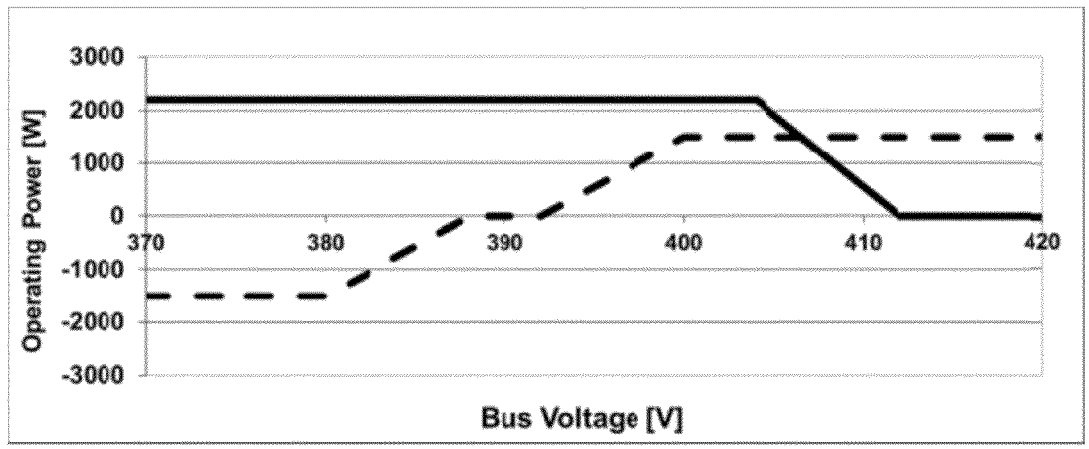
FIG. 5B is a graph illustrating a voltage controlled power regulation curve for a power storage unit according to an example embodiment.
Figure 5C:
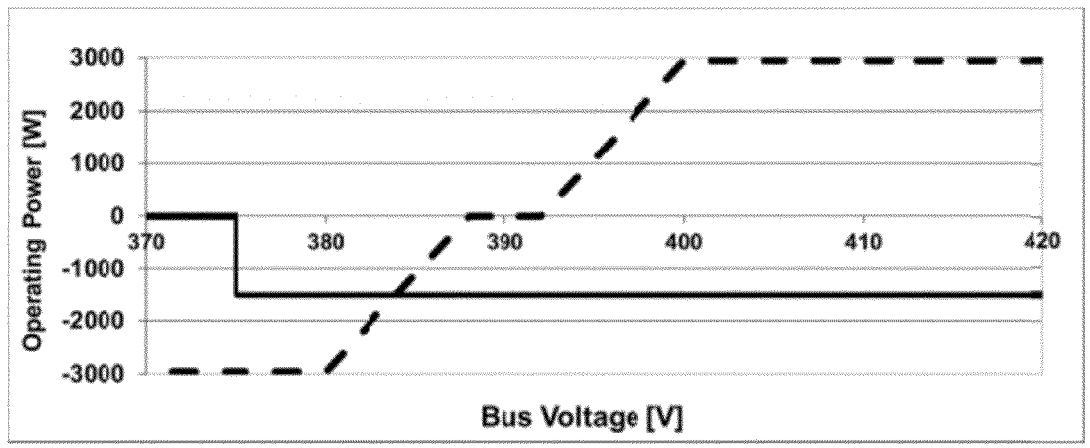
FIG. 5C is a graph illustrating a voltage controlled power regulation curve for an additional load energy unit according to an example embodiment.

In order to perform as intended, stability of the bus voltage must be maintained both at steady state, and also dynamically for small-signal perturbations. Steady state system stability requires that the DC bus voltage settle to a value that is both appropriate as a distribution voltage, and also indicative of the system's energy availability (i.e. monotonic and non-hysteretic) to enable smart load shedding and other advanced functionality. This aspect of the disclosed bus is achieved with the Voltage Controlled Power Regulation (VCPR) curves shown in FIG. 2A-C. The linear ramp portions of these curves dictate the location of the steady state transmission voltage for a given energy availability level. With reference to FIG. 5A, a 3000 W Energy Storage Unit (e.g. inverter) has the VCPR profile shown as a dashed line. A Primary Source Unit (e.g. a PV source) has a 2200 W output, shown as the solid line. The steady state operating voltage of the DC bus is determined by the point where the two lines cross (near 398V). In FIG. 5B the PSU is still operating at 2200 W, but the ESU is smaller, with only 1500 W of capacity. The operating voltage is higher, near 406V, and the higher voltage signals the PSU to curtail its output, while also indicating to other components attached to the bus that more energy is available than is being consumed. This could result in an additional load activating that was not previously on. In FIG. 5C a 1500 W constant load has been turned on. In this scenario the bidirectional 3000 W inverter supplies the necessary power to maintain the load at approximately 384V.

Figure 6A:
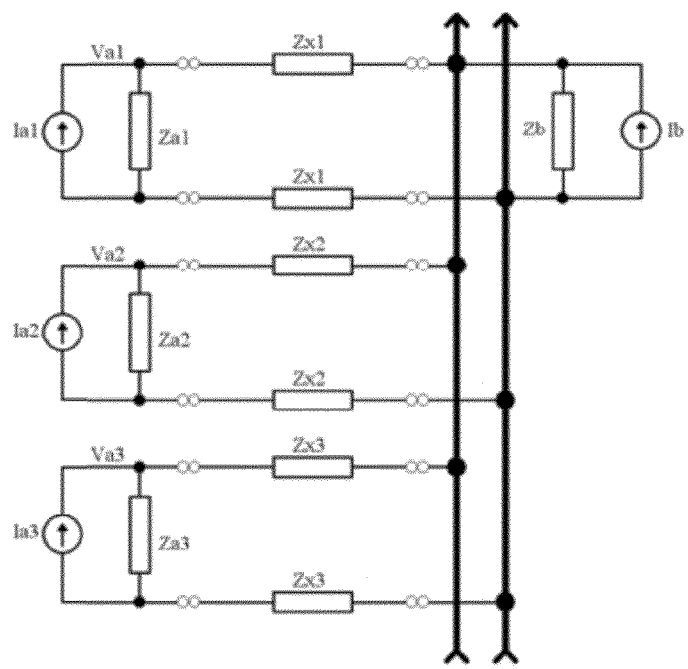
FIG. 6A is a block schematic diagram illustrating a model of one or more sources connected in parallel with one or more sinks according to an example embodiment.

The bus must also maintain small-signal or dynamic stability. This is accomplished by segregation of impedances in the frequency domain. With reference to FIG. 6A, the microgrid can be modeled as one or more sources connected in parallel with one or more sinks. In this analysis the power converters are modeled as current sources with Norton impedances, but voltage sources with Thévenin impedances would be equivalent. For current source Ia1 the Norton impedance Za1 includes all of the system dynamics including the power converter plant, passive filter components, and the microprocessor control loop. Similarly the impedances Zx1 sum the effects of all of the transmission line parasitics (resistance, inductance, capacitance to ground, and capacitance to each other).

This microgrid architecture is designed to accommodate unspecified numbers of sources and sinks, but each additional power converter changes the line impedance that every other power converter observes. So the disclosed approach is to make a specification per unit power and then stipulate that sources cannot overpower sinks by more than a given overload factor (for example 2). This overload factor is then built into the microgrid specification such that reduced impedance due to additional power converters does not impact system stability.

Figure 6B:
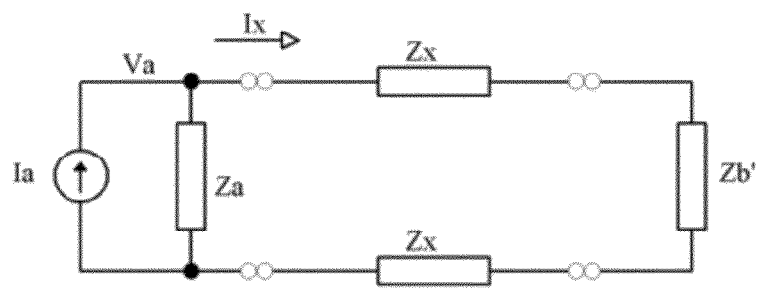
FIG. 6B is a block schematic diagram illustrating an alternative model where one of the sinks has been replaced with an equivalent small signal impedance according to an example embodiment.

Since the specification is per unit power, analysis can be performed on isolated sections (for example one source and one sink) and then superposition used to analyze the complete system. With reference to FIG. 6B, the sink in the isolated section has been replaced with its equivalent small-signal impedance Zb'. This impedance includes the effects of the sink's control algorithm as well as the power converter plant and passive filter components (Zb).

From this simplified section, a block diagram (shown in FIG. 6C) is used to calculate the system dynamics. Nichols theorem says that if the loop gain plotted on a polar plot does not encircle the point (−1,0) the system will be stable. With regard to a standard Nichols plot, the point where the loop gain crosses the x-axis informs about the gain margin while the phase angle where the loop gain crosses the unit circle informs about the phase margin.

Figure 6C:
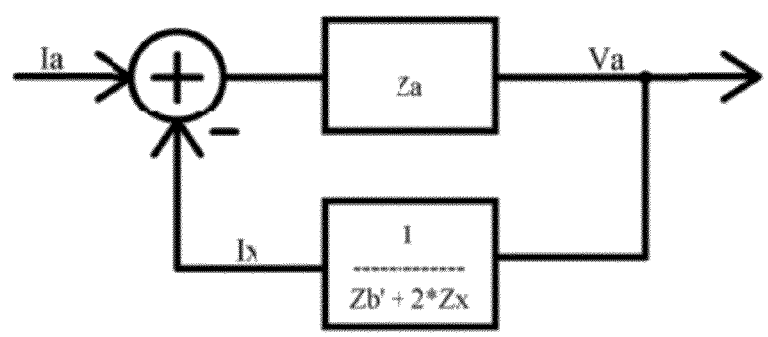
FIG. 6C is a block schematic diagram illustrating a simplified section used to calculate the system dynamics according to an example embodiment.

The loop gain of the block diagram in FIG. 6C is Za divided by Zb'+2*Zx or equivalently, the output impedance of the source divided by the input impedance (plus transmission impedance) of the sink. As long as the output impedance is less than the input impedance the system will be stable since the unit gain circle on the Nichols plot has not been reached. At the point when the output impedance of the source is equal to the input impedance of the sink (plus the transmission impedance), the difference in phase (source output impedance phase minus sink input impedance phase) should be less than 180 degrees.

Figure 7:
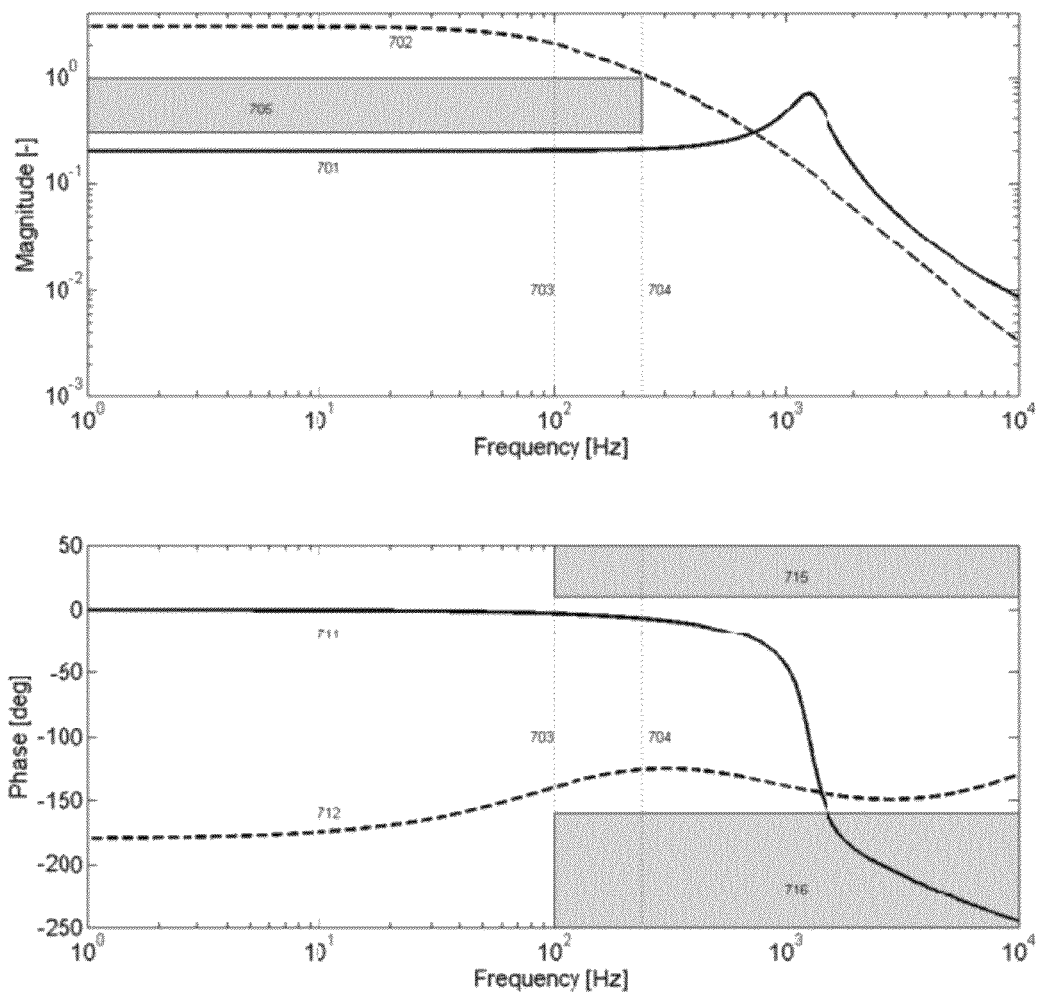
FIG. 7 shows an example of magnitude and phase keepout areas for component source and sink impedance according to an example embodiment.

To ensure that these conditions are met, keepout areas are defined for the power converter's impedances. FIG. 7 shows gain and phase plots (Bode plots) for an example source output impedance magnitude 701 and phase 711 and sink input impedance magnitude 702 and phase 712 versus frequency. The magnitude keepout area 705 sets a lower limit for the input impedance magnitude 702 and an upper limit for the output impedance magnitude 701. The magnitude keepout area 705 extends to the magnitude keepout frequency 704 guaranteeing that the output source impedance is never more than the input source impedance and hence the system is stable in this frequency range.

Beyond the magnitude keepout frequency 704, the phase of the source impedance 711 must be less than 180 degrees greater than the phase of the sink impedance 712. This is assured by the phase keepout areas 715 and 716. The upper phase keepout area 715 defines the maximum allowable phase of the source impedance 711. The lower phase keepout area 716 defines the minimum allowable phase of the sink impedance 712. The phase keepout areas begin at frequency 703 which is necessarily less than the magnitude keepout area frequency 704 to ensure that either the ratio of the magnitudes is less than 1 or the difference in phase is less than 180 degrees and the Nichols criterion is met for all frequencies. Again, these impedances are compared against the specification as per unit power (typically per kilowatt) and consequently the system scales to incorporate more power converters. The width of the magnitude keepout areas accounts for mismatch of sinks and sources as well as unforeseen impedances found in any real-world application. The phase keepout areas are less than 180 degrees apart for a similar margin of safety.

In some embodiments, robust components may be used for primary source generation equipment situated in challenging environments. This benefit comes from the use of DC/DC equipment at the point of generation rather than DC/AC conversion equipment. Specifically, DC/AC converters typically require the use of heat-sensitive components with limited lifetimes—especially electrolytic capacitors—in order to store the steady-state flow of input energy from the source, while delivering pulses of energy at 120 Hz as required to produce 60 Hz AC power. These components are not necessary in DC/DC applications, greatly reducing the thermal management challenge of electronics mounted directly to PV modules. The small amount of capacitance needed can be supplied with robust ceramic or film-based capacitors.

The invention claimed is:

1. A system comprising:
a first energy unit having a voltage converter coupled to an energy device and adapted to couple to a pair of split DC rails,
a second energy unit having a voltage converter coupled to an energy device and adapted to couple to the rails, wherein each of the energy units sense the voltage on the DC rails and regulate the rail voltage by energy unit current responses that create the aggregate effect of controlling the rail voltage in cooperation with other energy units coupled to the DC rails.

2. The system of claim 1 wherein at least one of the energy units has communications circuitry that transfers data to other energy units coupled to the DC rails by coupling an AC signal to the DC rails in either differential mode with respect to each other or common mode with respect to ground.

3. The system of claim 2 where the communications data is encoded by Frequency Shift Keying.

4. The system of claim 1 and further comprising a storage unit having a voltage converter coupled to a storage device and sourcing or sinking power to the DC rails as a function of DC rail voltage.

5. The system of claim 4 wherein the storage device is the utility grid.

6. The system of claim 1 wherein the split DC rails have a substantially equal but opposite polarity voltage.

7. The system of claim 6 where the potential of each conductor relative to ground potential is in the range of +/−180-210 volts.

8. The system of claim 1 energy units source or sink power from or to the DC rails in accordance with a priority algorithm.

9. The system of claim 1 wherein the voltage converters are adapted to automatically disconnect from the DC rails without damage when the DC rails are shorted together.

10. The system of claim 9 wherein the energy units short the DC rails in response to a fault or to stop or prohibit function of the system.

11. The system of claim 1 and further comprising a ground fault detector to couple to the split rails of the DC bus.

12. The system of claim 1 wherein one or more of the energy units is coupled to a source of solar electricity.

13. The system of claim 1 wherein one or more of the energy units is coupled to a wind-powered source of electricity.

14. The system of claim 1 wherein one or more of the energy units is coupled to at least two different sources of electricity.

15. A device comprising:
 an energy unit coupled to an energy device and adapted to couple a pair of split DC rails, and
 a controller to sense the voltage on the DC rails and regulate its output current response by current responses that create the aggregate effect of controlling the rail voltage in cooperation with other energy units coupled to the DC rails.

16. The device of claim 15 wherein the energy unit has a communications module to communicate with other energy units coupled to the DC rails.

17. A method comprising:
 sensing a voltage via an energy unit coupled to a pair of split DC rails;
 determining from that voltage a current response;
 implementing the current response and repeating the above steps to create the aggregate effect of controlling the rail voltage in cooperation with other energy units coupled to the DC rails.

18. The method of claim 17 wherein magnitude areas are used to specify the current response, and wherein the rail voltage is controlled by the energy units in the absence of a central bus voltage controller.

19. The method of claim 17 wherein phase keepout areas are used to specify the current response.

20. The method of claim 17 wherein magnitude and phase keepout areas are used to specify the current response as a function of per unit power.

\* \* \* \* \*